(12) United States Patent
Wang et al.

(10) Patent No.: US 9,076,605 B2
(45) Date of Patent: *Jul. 7, 2015

(54) TOUCH PANEL

(75) Inventors: Qiang Wang, Dongguan (CN); Zhi-Hua Zeng, Dongguan (CN); Chong-Jun Li, Dongguan (CN); Bing-Quan Fan, Dongguan (CN)

(73) Assignee: Molex Incorporated, Lisle, IL (US)

( * ) Notice: Subject to any disclaimer, the term of this patent is extended or adjusted under 35 U.S.C. 154(b) by 440 days.

This patent is subject to a terminal disclaimer.

(21) Appl. No.: 13/466,016

(22) Filed: May 7, 2012

(65) Prior Publication Data

US 2013/0118875 A1 May 16, 2013

(30) Foreign Application Priority Data

| May 6, 2011 | (CN) | ............ | 2011 1 0121517 |
| May 6, 2011 | (CN) | ............ | 2011 1 0121528 |
| May 6, 2011 | (CN) | ......... | 2011 2 0149330 U |

(51) Int. Cl.
*H03K 17/94* (2006.01)
*H01H 9/18* (2006.01)
*G06F 3/044* (2006.01)
*G06F 3/041* (2006.01)

(52) U.S. Cl.
CPC .............. *H01H 9/182* (2013.01); *G06F 3/044* (2013.01); *G06F 3/0412* (2013.01)

(58) Field of Classification Search
CPC .................. H01H 9/182; H03K 2217/96042; G06F 3/044; G06F 3/04886; G06F 3/023; G06F 3/03547; G06F 3/0412
USPC ....... 340/815.4; 341/1, 22; 200/5 A; 345/173, 345/174, 175, 176, 156
See application file for complete search history.

(56) References Cited

U.S. PATENT DOCUMENTS

| 4,264,903 | A | * | 4/1981 | Bigelow ......................... 341/1 |
| 6,167,182 | A | | 12/2000 | Shinohara et al. |
| 7,786,981 | B2 | | 8/2010 | Proctor |
| 8,274,409 | B2 | | 9/2012 | Lin et al. |
| 8,363,007 | B2 | | 1/2013 | Shih et al. |
| 8,669,944 | B2 | * | 3/2014 | Klinghult et al. ............. 345/173 |
| 2002/0018340 | A1 | | 2/2002 | Okamoto |
| 2005/0078057 | A1 | | 4/2005 | Chang et al. |
| 2008/0080160 | A1 | | 4/2008 | English et al. |

(Continued)

FOREIGN PATENT DOCUMENTS

| TW | M293398 U | 7/2006 |
| TW | M343209 | 10/2008 |
| TW | M387315 | 8/2010 |

*Primary Examiner* — Anh V La

(57) ABSTRACT

The Present Disclosure provides a touch panel, which consists of a main panel and a light-emitting touch module mounted under the main panel. The light-emitting touch module consists of a first circuit board provided with a plethora of touch sensors and light-emitting devices under the main panel. These touch sensors are used to induce the approaching signals of the operator, and transmit the induction signals to a touch control circuit for controlling the light-emitting status of the corresponding light-emitting device. The light-emitting touch module also consists of a second circuit board, electrically connected with the first circuit board. The touch control circuit is provided on the second circuit board, spatially separated from the first circuit board by a certain distance, so that the electromagnetic interferences of the touch control circuit on the touch sensors may be reduced.

20 Claims, 11 Drawing Sheets

(56) References Cited

U.S. PATENT DOCUMENTS

| | | |
|---|---|---|
| 2008/0143681 A1 | 6/2008 | XiaoPing |
| 2009/0096754 A1 | 4/2009 | Hinata |
| 2009/0140996 A1 | 6/2009 | Takashima et al. |
| 2009/0160671 A1 | 6/2009 | Shih et al. |
| 2010/0008067 A1 | 1/2010 | Tai et al. |
| 2010/0265193 A1 | 10/2010 | Kung et al. |
| 2011/0069030 A1* | 3/2011 | Nozawa ............... 345/173 |
| 2011/0095998 A1* | 4/2011 | Hsieh et al. ............ 345/173 |

* cited by examiner

TOUCH PANEL

REFERENCE TO RELATED APPLICATIONS

The Present Disclosure claims priority to prior-filed Chinese Utility Model Patent Application No. 201120149330, entitled "Touch Panel," filed on 6 May 2011 with the State Intellectual Property Office of the People's Republic of China; Chinese Patent Application No. 201110121528.0, entitled "Touch Panel," filed on 6 May 2011 with the State Intellectual Property Office of the People's Republic of China; and Chinese Patent Application No. 201110121517.2, entitled "Touch Panel," filed on 6 May 2011 with the State Intellectual Property Office of the People's Republic of China. Additionally, the Present Disclosure is related to Taiwanese Utility Model Patent Application No. 100210368, entitled "Touch Panel," filed on 8 Jun. 2011 with the Intellectual Property Office of the Republic of China; Taiwanese Patent Application No. 10119966, entitled "Touch Panel," filed on 8 Jun. 2011 with the Intellectual Property Office of the Republic of China; and Taiwanese Patent Application No. 10119968, entitled "Touch Panel," filed on 8 Jun. 2011 with the Intellectual Property Office of the Republic of China. The content of each of the aforementioned Patent Applications are incorporated in their entireties herein.

BACKGROUND OF THE PRESENT DISCLOSURE

The Present Disclosure relates, generally, to a touch panel, and, more particularly, to a touch panel working in a stable and reliable way.

Due to the considerations of aesthetics and easy, convenient operation, there is an ever-increasing application of touch mode in the control panel of the existing motor product; that is, providing the display patterns on the panel of the product, and then inducing the operation of the through providing capacitance- or resistance-typed touch sensors under the panel and converting them into corresponding electric signals to transmit to a touch control circuit. The touch control circuit can correspondingly control the light-emitting status of the corresponding light-emitting device, and the lights emitted by the light-emitting device can illuminate the display patterns on the panel. The touch control circuit can also send the corresponding signals to the main control circuit to control the working status of the motor product. In this way, it can effectively achieve human-computer interactions, and improve the operative convenience of the electronic product.

Taiwanese Patent No. 97208965 (the content of which is incorporated herein in its entirety) discloses a touch panel display equipment, which mainly consists of a touch control circuit, electrically connected with at least one touch sensor and a corresponding light-emitting device. The touch sensor can induce an approaching signal and transmit it to the touch control circuit to control the power of the light-emitting device. A main panel is also on the touch panel display equipment, provided with a light hole corresponding to the position of the above-mentioned light-emitting device, the light-emitting device is provided at one side of the light hole. Finally, a nameplate is also disclosed, which is provided the display pattern of the panel on it, a light conducting device, which is provided at the light hole. When operating the touch sensor to make the light-emitting device illuminate, the lights will penetrate through the light conducting device, uniformly scatter into the light hole and refract at the nameplate.

This existing touch panel integrally arranges the touch sensors and their corresponding touch control circuits onto a printing circuit board, since the touch sensor is easily influenced by the electromagnetic noises generated by its adjacent touch control circuits. The induction signals of the touch sensor will fluctuate after it has been interfered, which may further cause the touch control circuit to send out wrong working instructions. Additionally, if the traditional one-board design is adopted, it may require very high quality demands and more efforts in the processes of design, element selection and manufacturing to effectively reduce or diminish the electromagnetic interferences of the touch control circuit on the touch sensors, which will greatly raise the manufacturing cost.

Therefore, the defect in the existing touch panel lies in a relatively poorer working reliability of the touch panel caused by lowering the required standard on the anti-electromagnetic interference ability of the touch sensor, or a great increase in the manufacturing cost to improve the anti-electromagnetic interference ability of the touch sensor.

SUMMARY OF THE PRESENT DISCLOSURE

The Present Disclosure overcomes the aforementioned deficiencies, and providing a touch panel, which can effectively improve the anti-interference ability of the touch sensor at a lower cost, thus improving working stability and reliability.

To solve aforementioned technical problems, the Present Disclosure provides a touch panel, which consists of a main panel and a light-emitting touch module mounted under the main panel. The light-emitting touch module consists of a first circuit board provided with a plethora of touch sensors and light-emitting devices under the main panel. These touch sensors are used to induce the approaching signals of the operator, and transmit the induction signals to a touch control circuit for controlling the light-emitting status of the corresponding light-emitting device. The light-emitting touch module also consists of a second circuit board, electrically connected with the first circuit board. The touch control circuit is provided on the second circuit board, spatially separated from the first circuit board by a certain distance, so that the electromagnetic interferences of the touch control circuit on the touch sensors may be reduced.

The light-emitting touch module may also consist of a display module provided in a parallel way with the first circuit board. The second circuit board may be mounted under the display module and form a height difference with the first circuit board. The second circuit board may be electrically connected with the first circuit board by a connector. The touch control circuit may consist of a microprocessor control circuit and a light-emitting device control circuit. The electronic components forming the touch control circuit are mounted on the bottom surface of the second circuit board departing the main panel, and these touch sensors are mounted on the top surface of the first circuit board facing the main panel.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

Figure 1:
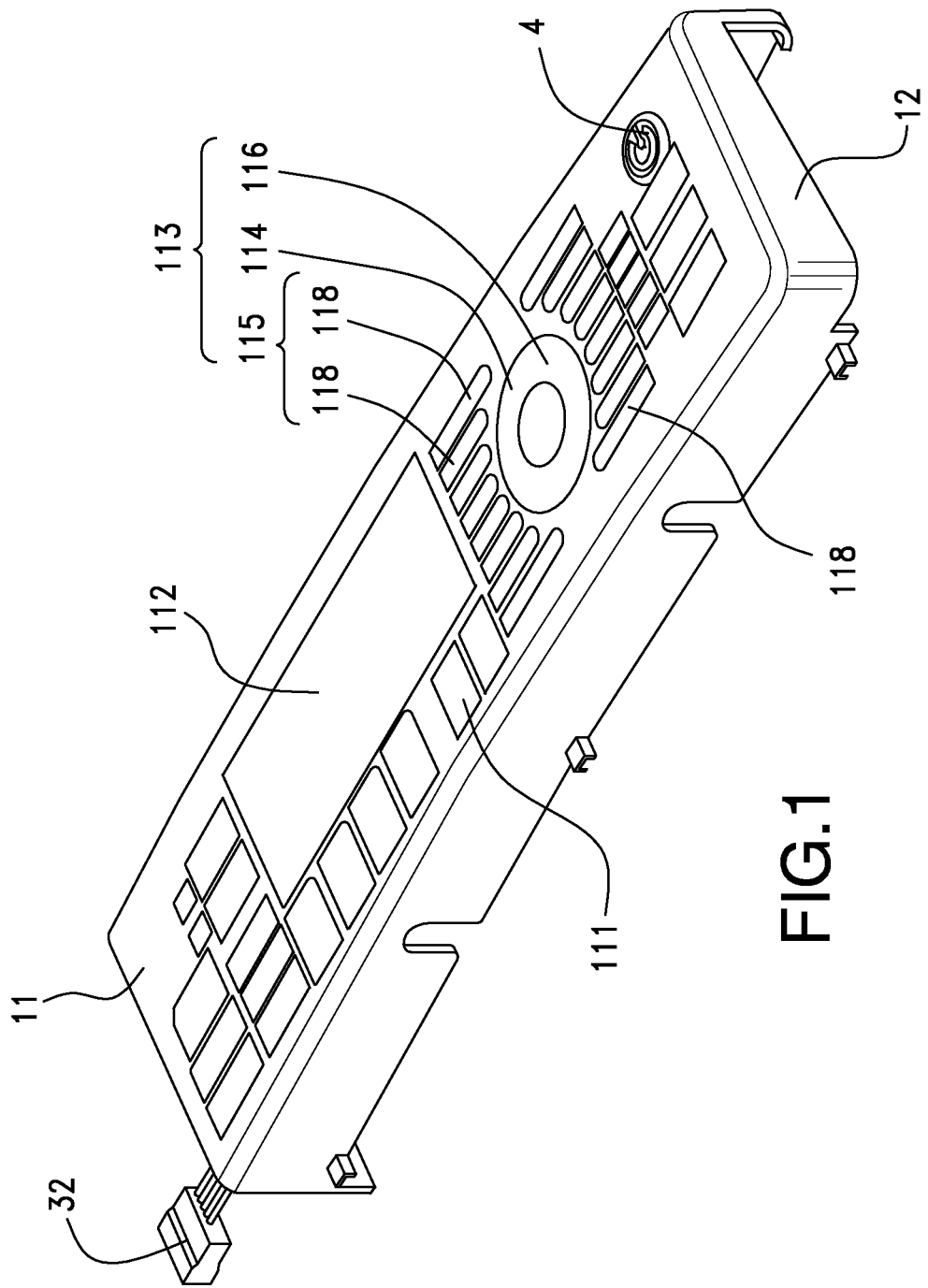
FIG. 1 is a stereogram of a touch panel of the Present Disclosure.
Figure 2:
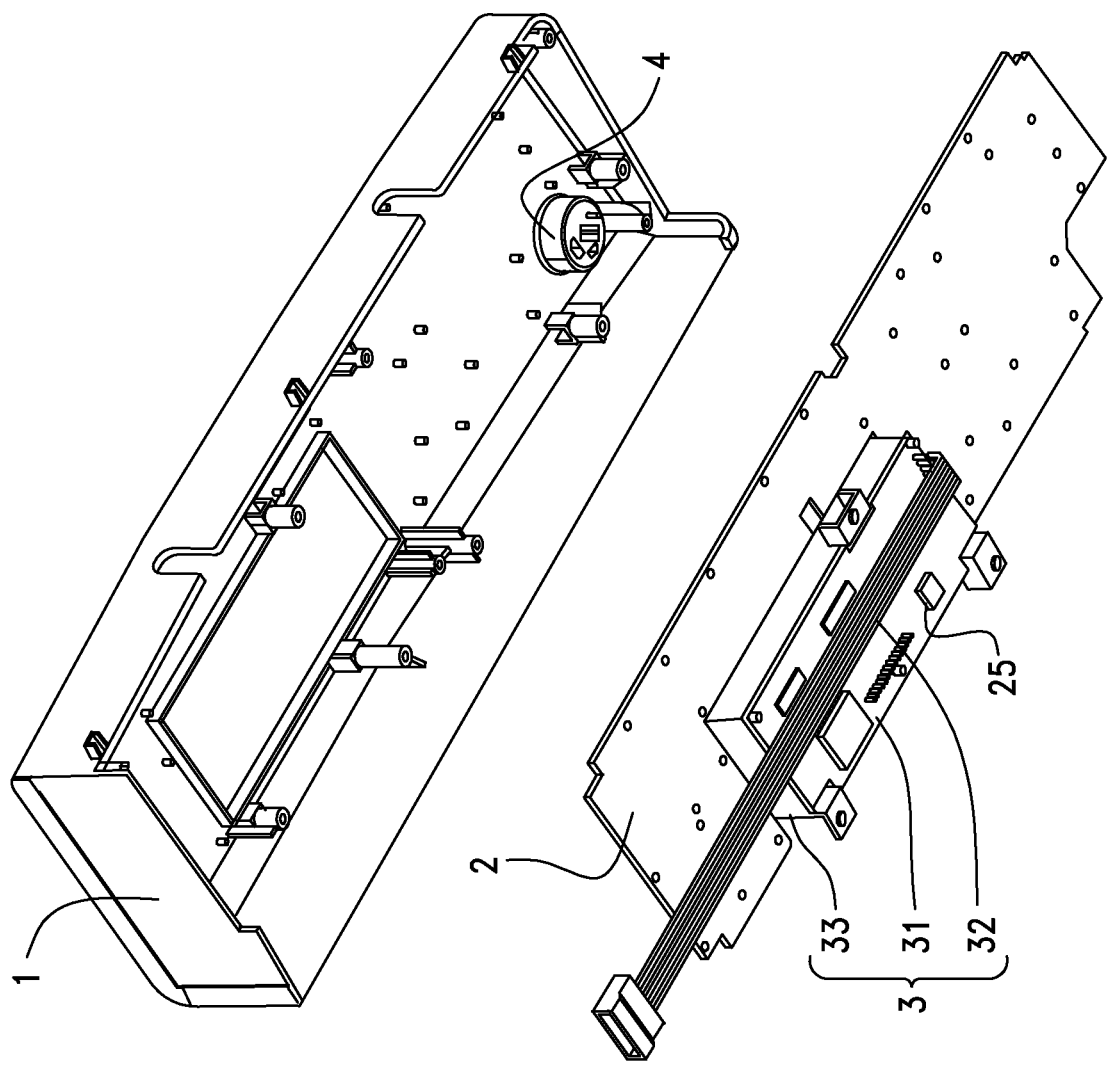
FIG. 2 is a stereoscopic exploded view of the touch panel of FIG. 1.
Figure 3:
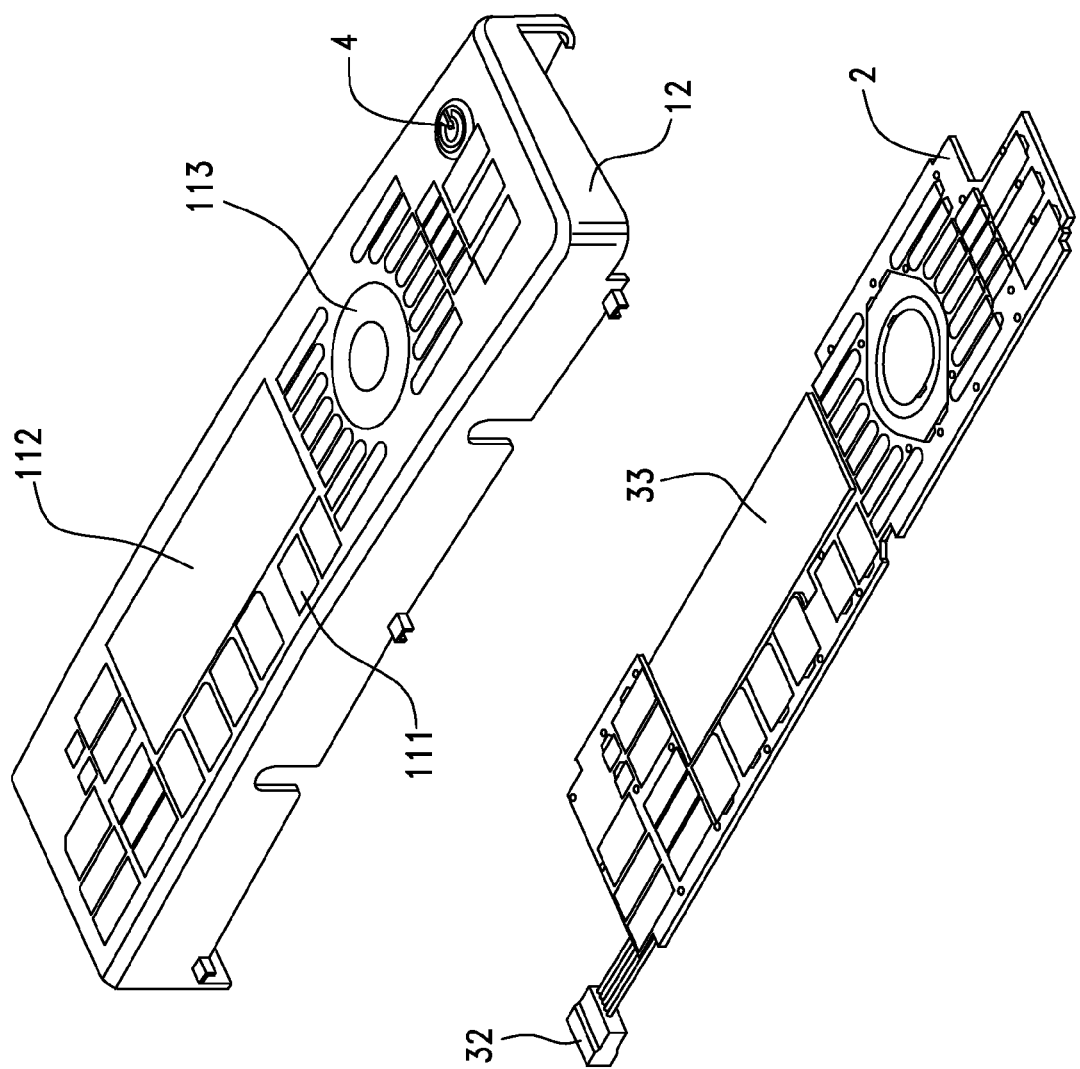
FIG. 3 is another stereoscopic exploded view of the touch panel of FIG. 1.
Figure 4:
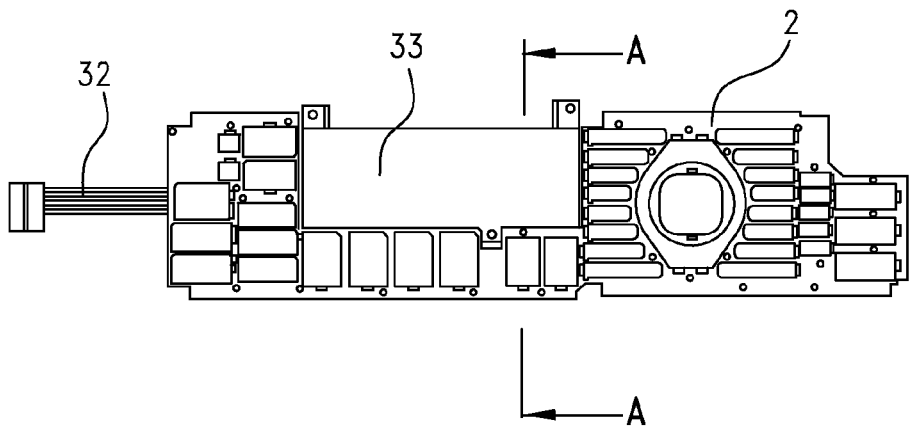
FIG. 4 is a top view of the touch panel of FIG. 1, after the removal of the main panel.
Figure 5:
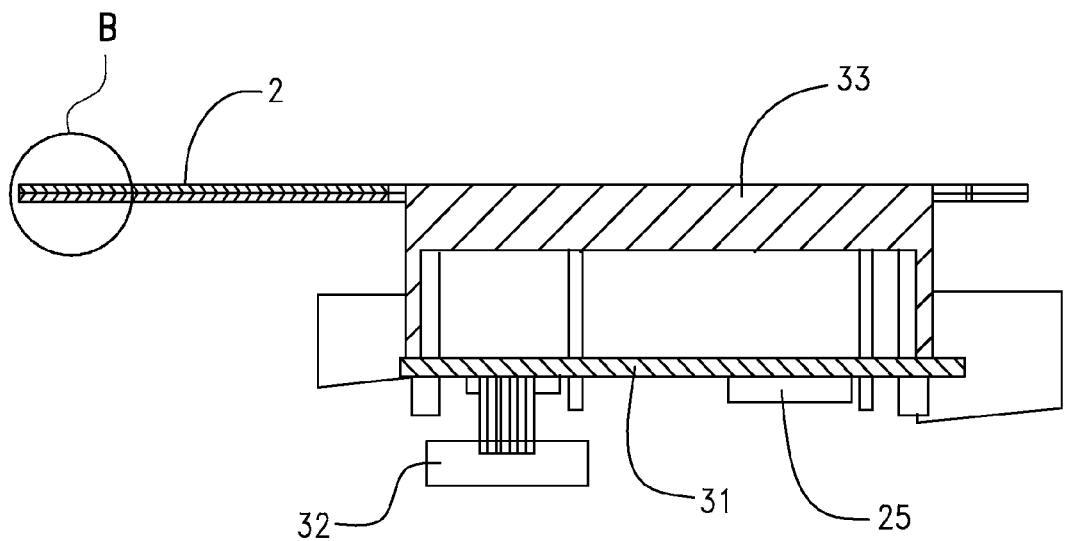
FIG. 5 is a sectional view along Line A-A of FIG. 4.
Figure 6:
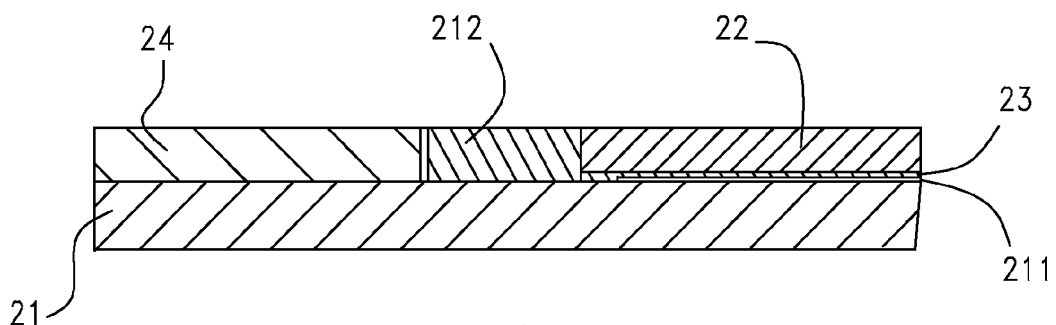
FIG. 6 is a partially enlarged view of Area B of FIG. 5.
Figure 7:
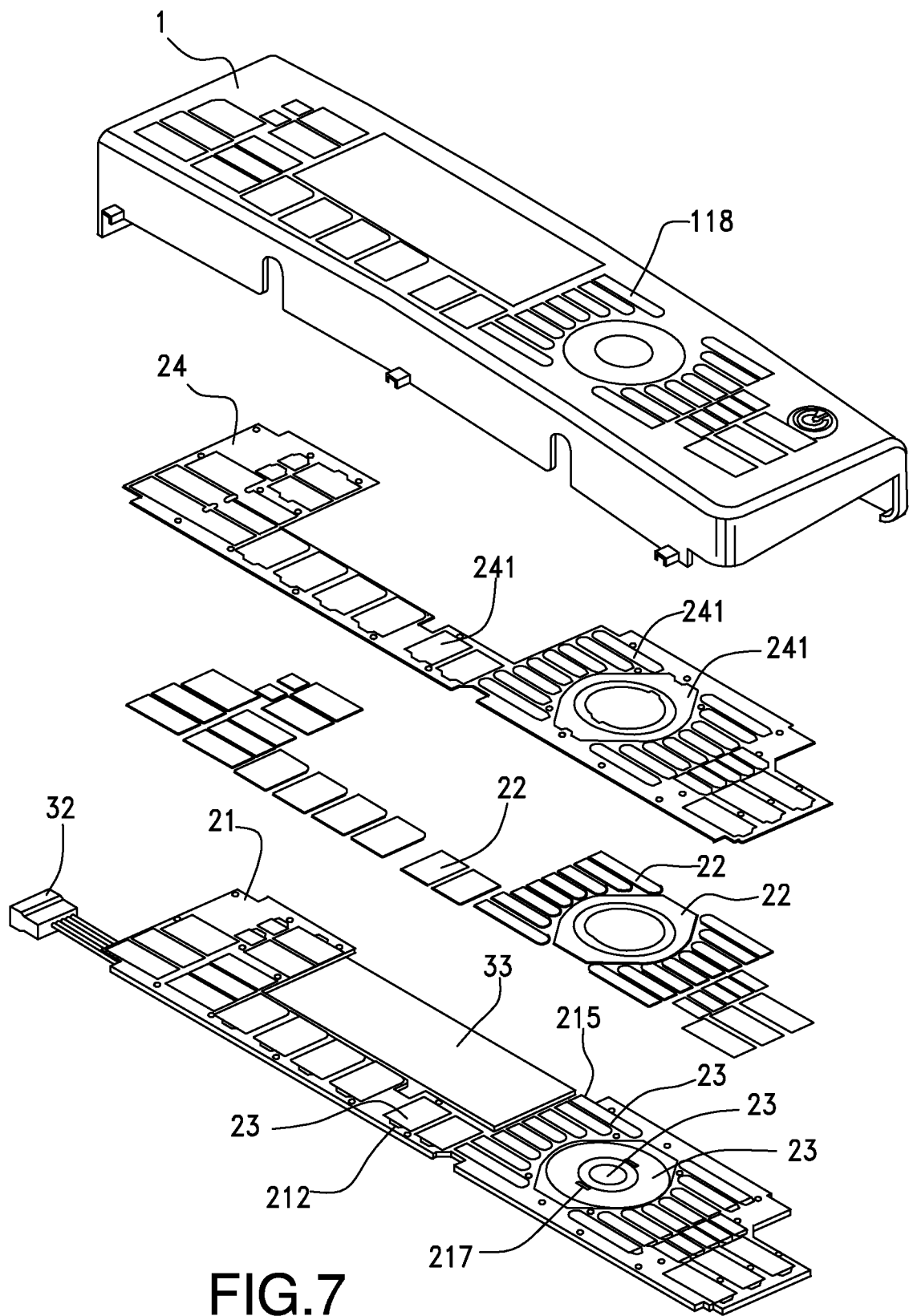
FIG. 7 is a stereoscopic exploded view of the touch panel of FIG. 1.
Figure 8:
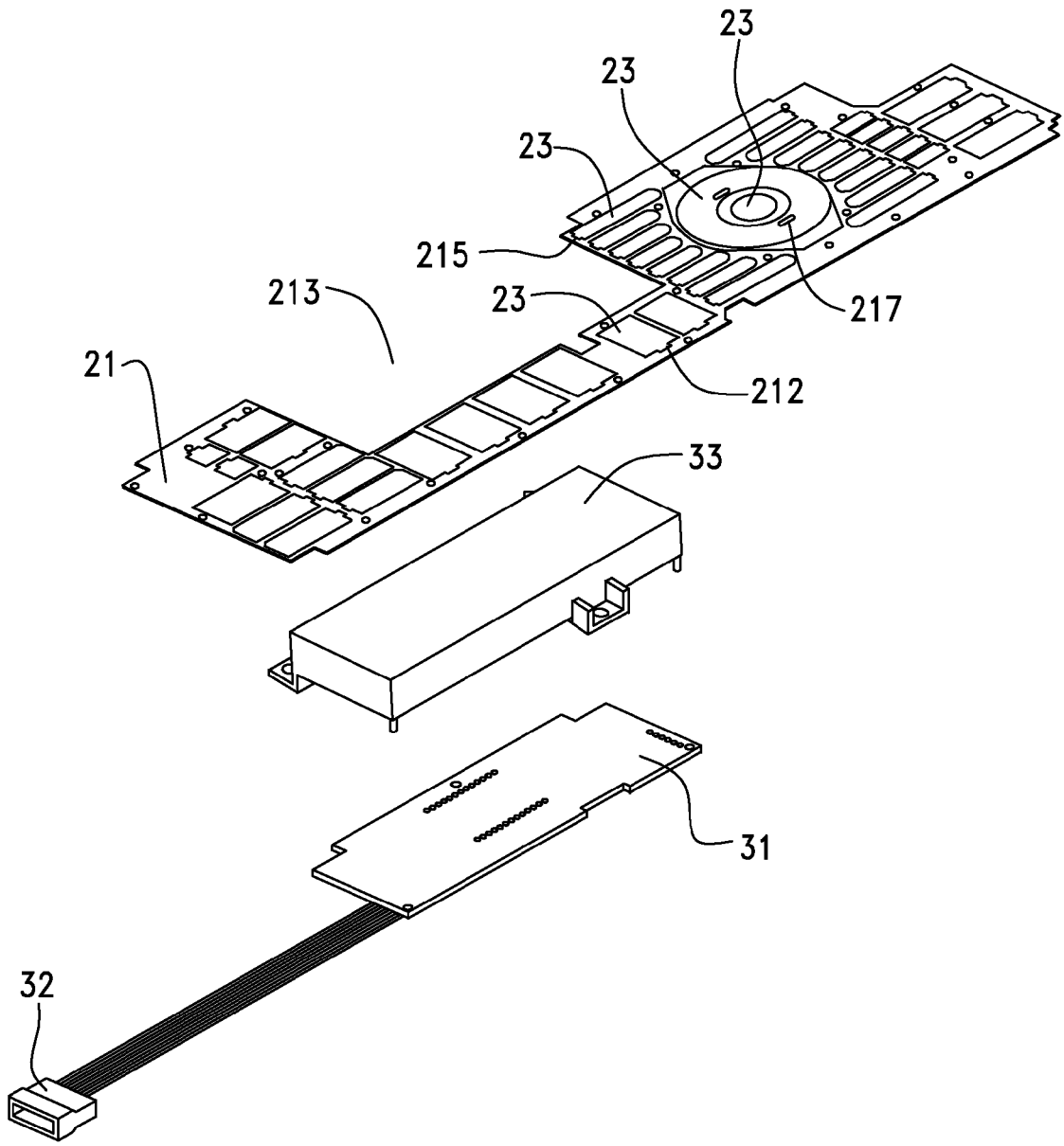
FIG. 8 is a stereoscopic exploded view of a first circuit board, a display module and a second circuit board of the touch panel of FIG. 1.

While the Present Disclosure may be susceptible to embodiment in different forms, there is shown in the Figures, and will be described herein in detail, specific embodiments, with the understanding that the disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

As shown in FIG. 1 to FIG. 8, the touch panel of the Present Disclosure consists of a main panel 1, a light-emitting touch module 2 mounted under the main panel 1 and a power switch 4 mounted on the main panel 1. The touch panel is mainly provided with two different types of touch display modes, one is a relatively traditional combination type integrating both touch and display, and the other is a correspondence type consisting of a combined touch area and a combined display area, which is invented by the Present Disclosure.

The main panel 1 is a transparent ABS plastic piece, which shows an integral frame structure with only one opening at the lower end, and has a base 11 and four lateral plates 12 extending downward from the periphery of the base 11. The light-emitting touch module 2 is accommodated in the cavity formed by the base 11 and four lateral plates 12. The base 11 is provided with an opening at only one corner for mounting the power switch 4, when mounted into the laundry machine, necessary treatments are only required at the opening to achieve the water and dust proof, so as to prevent the light-emitting touch module 2 from being damaged.

A plethora of first touch display areas 111 corresponding to above-mentioned first touch mode, a display window 112 and a second touch display area 113 corresponding to above-mentioned second touch mode are provided on the base 11.

The second touch display area 113 mainly consists of an annular combined touch area 114 an a combined display area 115 corresponding to the combined touch area 114, the combined display area 115 consists of a plethora of sub-display units 118 provided at both sides of the combined touch area 114, and corresponding function display pattern is printed on each sub-display unit 118 (not shown, which separately corresponds to a laundry mode of the laundry machine). The second touch display area 113 also consists of a touch display area 116 for function execution in the center of the annular combined touch area 114.

A non-transparent layer of ink is printed at the light-tight position on the lower surface of the base 11, and a transparent layer of ink is printed at the position requiring light transmission, for example, the first touch display area 111 and the back surface of the display pattern consisting of characters and/or patterns of the sub-display unit 118 in the combined display area 115, thus forming an effect of transparent window, when there is no illumination, the display pattern shows black, and when lights emit from the back surface of the transparent window, the corresponding display pattern is visible.

The light-emitting touch module 2 consists of a first circuit board 21, several light conducting pieces 22, several light reflecting pieces 23, a distance piece 24, a main circuit module 3 and a touch control circuit 25 mounted on the main circuit module 3. Refer to FIG. 4 to FIG. 8, the top surface of the first circuit board 21 is correspondingly provided with first touch sensors 211 and first light-emitting devices 212 under the first touch display area 111 of the main panel 1. A gap 213 is also formed in one side of the first circuit board 21.

Figure 9:
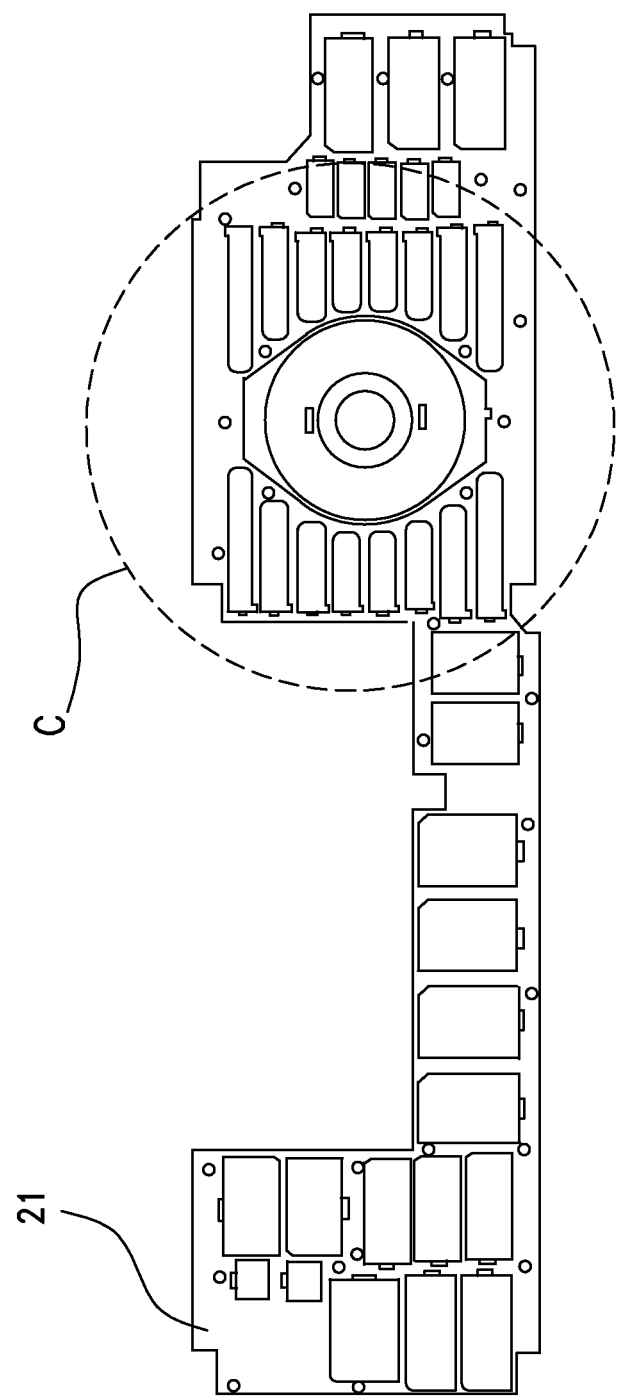
FIG. 9 is a top view of the first circuit board of FIG. 8.
Figure 10:
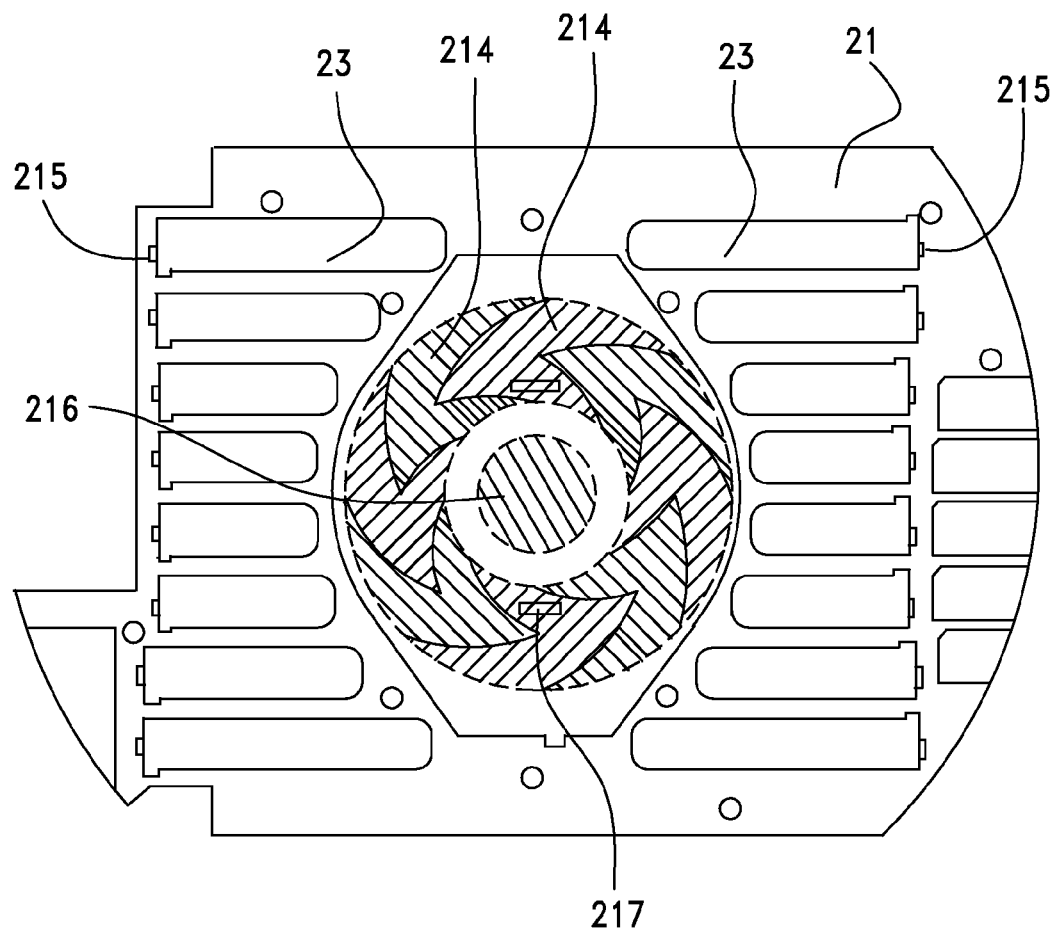
FIG. 10 is a partially enlarged view of Area C of FIG. 9, in which a partially perspective treatment has been made on the touch sensor area to show the physical distribution of each sensor.

Refer to FIG. 9 and FIG. 10, the first circuit board 21 is also provided with a plethora of second touch sensors 214 corresponding to the combined touch area 114 of the main panel 1, a third touch sensor 216 corresponding to the touch display area 116 for function execution, a plethora of second light-emitting devices 215 corresponding to the sub-display units 118 of the combined display area 115 and two third light-emitting devices 217 corresponding to the combined touch area 114 and the touch display area 116 for function execution on the top surface facing the main panel 1.

The first touch sensors 211, the second touch sensors 214 and the third touch sensors 216 in the present embodiment are all touch sensors of capacitance induction type, however, in other embodiments, the touch sensors of resistance induction type may also be adopted, and the touch sensors 211, 214 and 216 may be used to induce an approaching signal from the operator (such as a finger touch). Wherein, only one touch sensor is provided under either the first touch display area 111 or the touch display area 116 for function execution in a one-to-one correspondence way, while a plethora of second touch sensors 214 are continuously arranged on the front surface of the first circuit board 21 along the annular rotation direction in a head to tail way under the annular combined touch area 114 (see FIG. 10); there are altogether eight second touch sensors 214, in which the boundary between the adjacent two second touch sensors 214 shows a goose tail shape, and such boundary structure is beneficial to reducing the signal interferences between the adjacent two second touch sensors 214; each second touch sensor 214 logically consists of the copper foils (not shown) provided between the two boundaries. The first light-emitting devices 212, the second light-emitting devices 215 and the third light-emitting devices 217 are preferred to use LEDs (light-emitting diode).

The light conducting pieces 22 are manufactured by PC plastics (polycarbonate), and are correspondingly provided under each first touch display area 111, combined touch area 114, combined display area 115 and touch display area 116 for function execution of the main panel 1. Wherein, the top surface of the light conducting piece 22 is preferred to adopt a rough cloudy surface, which is beneficial to achieving a uniform light projection upwards; and the bottom surface is preferred to adopt a smooth surface, which is beneficial to reducing the lights escaping from the bottom surface, so that the attenuation may be reduced. The lateral margins of the light conducting piece 22 are connected in an attaching way with the first light-emitting device 212, the second light-emitting device 215 and the third light-emitting device 217, so that the lights emitted from the first light-emitting device 212, the second light-emitting device 215 and the third light-emitting device 217 may be conducted in a parallel way into a range with certain area, and then uniformly projected upwards onto the first touch display area 111, the combined display area 115, the combined touch area 114 and the touch display area 116 for function execution of the main panel 1 through the cloudy surface at the top, so that the function display patterns may appear on the main panel.

The light reflecting piece 23 is correspondingly provided under the light conducting piece 22, it can reflect the lights scattered from the bottom surface of the light conducting piece 22 to the top surface of the light conducting piece 22, thus improving the brightness of the display pattern. Refer to the FIG. 6, the light reflecting piece 23 is preferred to be a layer of light reflecting film printed on the first circuit board 21 with light reflecting inks (such as the white ink), and it is directly provided under the bottom surface of the light conducting piece 22 through connection in an attaching way, wherein, the light reflecting pieces 23 in the first touch display area 111 and the touch display area 116 are directly printed above the first touch sensor 211 or the third touch sensor 216. Compared with common light reflecting structures, this light reflecting film has advantages of low cost and thin structure. Through providing a light reflecting piece 23 under the light conducting piece 22, the light-emitting efficiencies of the first light-emitting device 212, the second light-emitting device 215 and the third light-emitting device 217 may be improved, so that the brightness of first touch display area 111, the combined display area 115, the combined touch area 114, and the touch display area 116 for function execution may be increased to achieve energy saving and environmental protection.

The distance piece 24 is provided between the base 11 and the first circuit board 21 of the main panel 1, and is manufactured by light-tight materials (such as the black foam). The distance piece 24 is provided with adhesives on its both surfaces, its top surface is adhered to the bottom surface of the main panel 1, and its bottom surface is adhered to the top surface of the first circuit board 21. The distance piece 24 can block the lights and locate the position, so as to effectively prevent the occurrences of optical crosstalk and light leakage among different display areas. The distance piece 24 is correspondingly provided with a plethora of accommodation through holes 241 on it, which are used for correspondingly accommodating the light conducting piece 22, the first light-emitting device 212, the second light-emitting device 215 or the third light-emitting device 217 in them.

Figure 11:
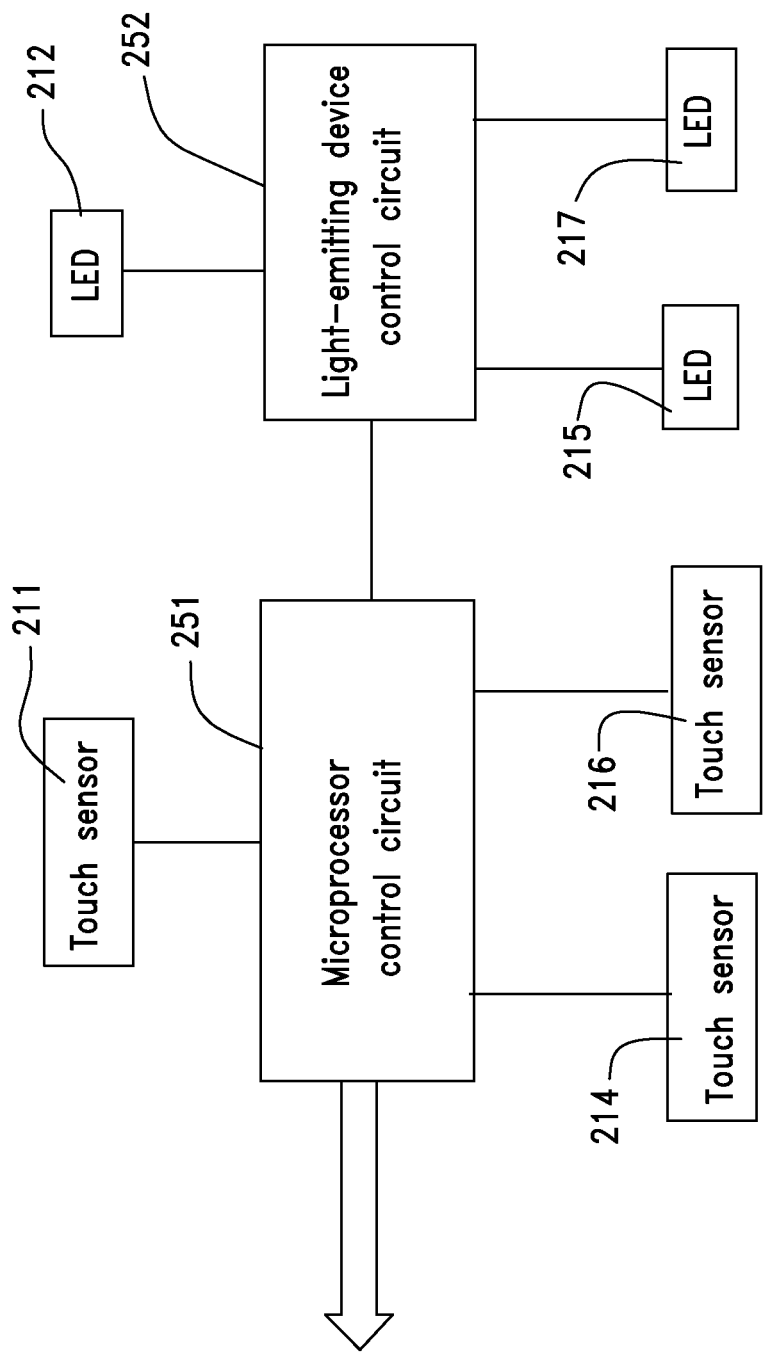
FIG. 11 is a frame diagram showing a touch control circuit of the touch panel of FIG. 1.

Refer to FIG. 11, the touch control circuit 25 mainly consists of a microprocessor control circuit 251 and a light-emitting device control circuit 252. The microprocessor control circuit 251 consists of a power circuit, a microprocessor and its accessory circuit, the microprocessor is preferred to adopt the model CY8C22545 microcontroller. The light-emitting device control circuit 252 may further consist of a shift register, a driving chip for the light-emitting device and other electronic components, the shift register is preferred to adopt the model 74HC595D, and the driving chip for the light-emitting device is preferred to adopt the model DS2003CMX.

Figure 12:
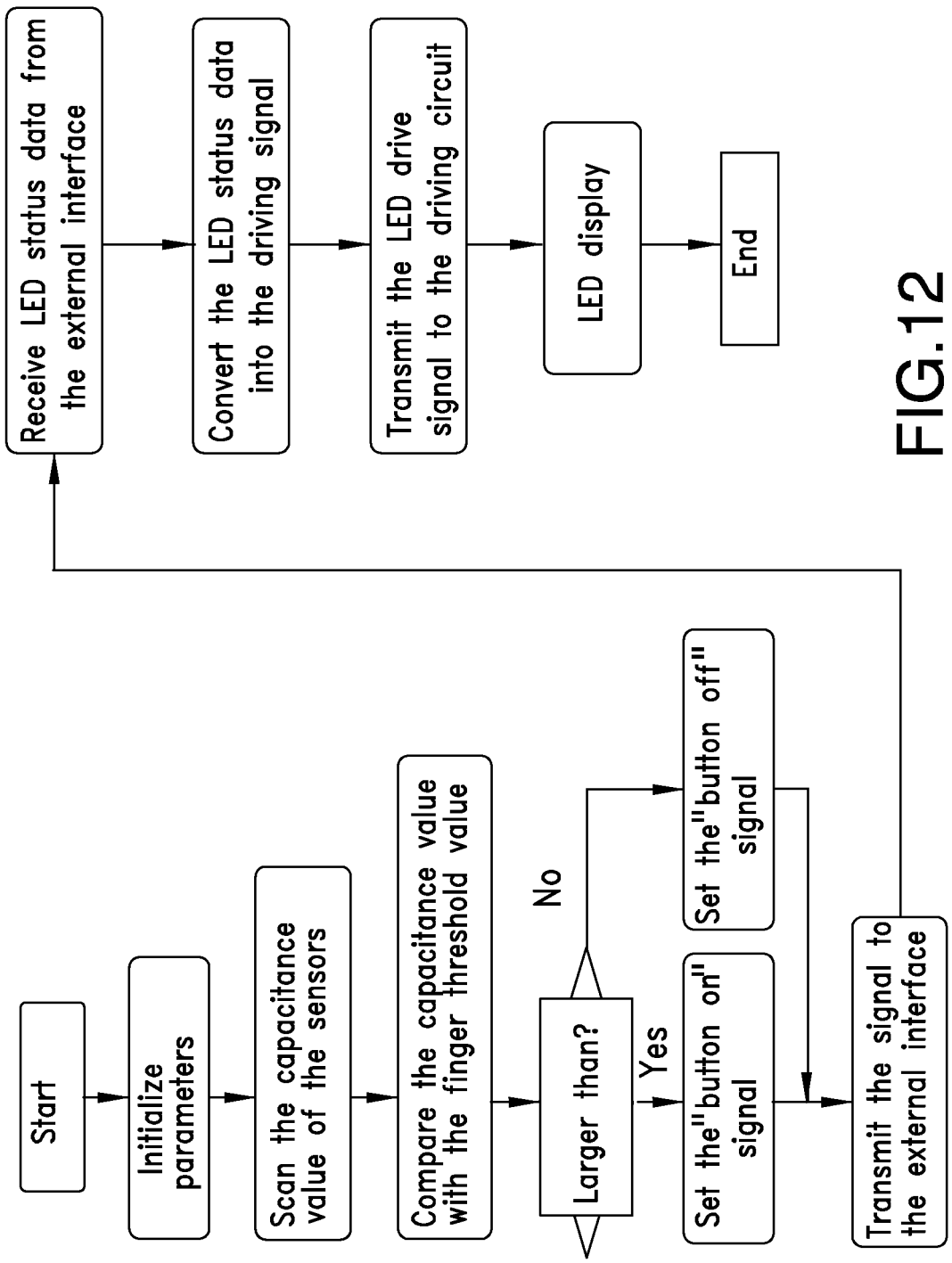
FIG. 12 is a workflow diagram of the touch control circuit of FIG. 11.
Figure 13:
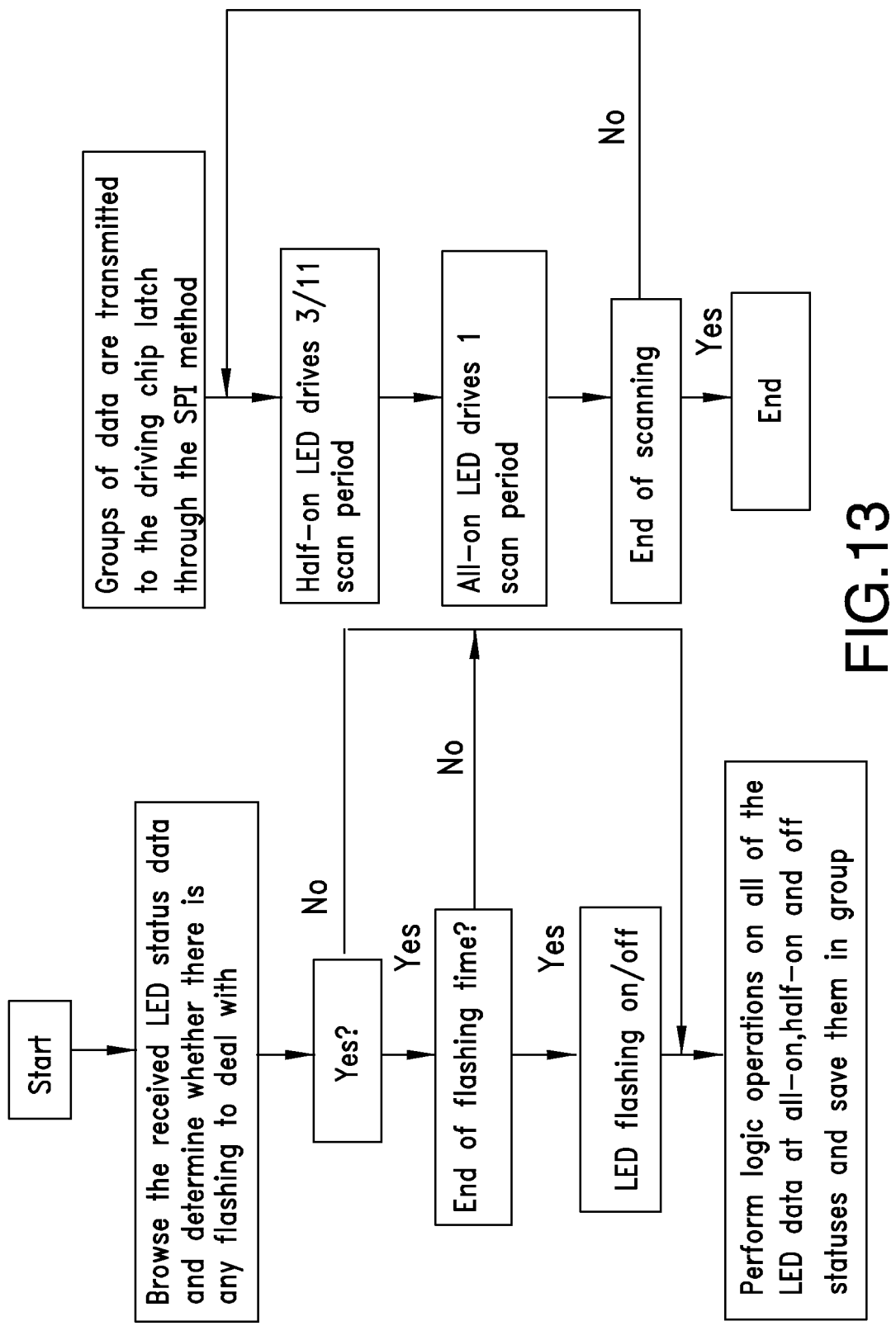
FIG. 13 is a flow diagram of the light-emitting device control circuit in the touch control circuit of FIG. 11.

Please refer to both FIG. 12 and FIG. 13, the microprocessor control circuit 251 can real-time monitor the induction signals (corresponding to the capacitance values of the touch sensors in the present embodiment) of each of above-mentioned first touch sensors 211, second touch sensors 214 and third touch sensors 216, compare them with a preset threshold value to determine the on-off status of the function button corresponding to each touch sensor, and transmit the on-off status signals to the external interface to drive the laundry machine to perform corresponding operations. Besides, the microprocessor control circuit 251 may also receive the control signals for the display status of the light-emitting device (LED) from the external interface, and convert them into the driving signals before transmitting to the light-emitting device control circuit 252. The light-emitting device control circuit 252 receives the signals sent out by the microprocessor control circuit 251, and accurately drives each corresponding light-emitting device to enter a different light-emitting status according to the signal logic: all-on, half-on and off, thus showing different working statuses on the main panel 1.

In practical applications, when the finger of the operator starts to approach one of the first touch display areas 111 on the main panel 1 from the top, the induction signal of the first touch sensor 211 under the first touch display area 111 (corresponding to the capacitance value of the touch sensor in the present embodiment) will gradually increase and the induction signal will be transmitted to the touch control circuit 25, when the touch control circuit 25 has monitored the capacitance value of the first touch sensor 211 exceeding the preset threshold value (at that moment, the finger has touched or has been very close to the surface of the first touch display area 111), the touch control circuit 25 can correspondingly control the first light-emitting device 212 on the lateral margin of the first touch sensor 211 to change from its initial half-on light-emitting status to the all-on light-emitting status, thus changing the backlight status of the function display pattern on the first touch display area 111 of the main panel 1, and informing the laundry machine of the operation information at the same time so that it can perform corresponding operations.

It should be specially noted that, in the present preferred embodiment, when the finger of the operator moves into a certain area within the combined touch area 114, the capacitance values of several second touch sensors 214 in the area close to the finger will change and the induction signals will be transmitted to the touch control circuit 25, the touch control circuit 25 will then perform a totaling calculation on these induction signals, and calculates the adjacent combination with the strongest induction signal change by the induction detection algorithm, thus determining the specific touch position of the finger above one of these second touch sensors 214, the present preferred embodiment may also be further specified to whether the touch position is above the boundary margin part of the second touch sensor 214 or above its middle section part, and then the second light-emitting device 215 under the sub-display unit 118 corresponding to the touch position in the combined display area 115 is controlled to change from the initial unselected first light-emitting status (corresponding to the half-on light-emitting status in the present embodiment) to the selected second light-emitting status (corresponds to the all-on light-emitting status in the present embodiment), while other second light-emitting devices 215 under the unselected sub-display units 118 still maintain their half-on light-emitting status; with such design, each physical second touch sensor 114 can correspond to two sub-display units 118 in the combined display area 115 (each sub-display unit 118 corresponds to a specific laundry mode), therefore, the eight second touch sensors 214 in the combined touch area 114 can correspond to sixteen sub-display units 118 in the combined display area 115, therefore, the arrangement density of the second touch sensors 214 may be reduced to lower the difficulty and the cost upon manufacturing. Other induction detection algorithms may also be adopted to build different mapping relations between the second touch sensor 214 and the sub-display unit 118, for example, the initial value may be the all-on light-emitting display of any one sub-display unit 118, each time when the finger skims over a second touch sensor 214, it will automatically switch to the all-on light-emitting display of the next adjacent sub-display unit 118, while the previous sub-display unit 118 returns to the half-on status. In this way, when the finger of the operator moves in a rotational way along the combined touch area 114, the second light-emitting devices 215 of selected corresponding sub-display units 118 in the combined display area 115 will successively be all-on, while the second light-emitting devices 215 of unselected sub-display units 118 will successively return to their original half-on status, and such operation interface makes the operator easily switch and select among various kinds of laundry modes. Finally, when the finger of the operator falls into the touch display area 116 for function execution, the third touch sensor 216 may induce the approaching signal of the operator's finger and transmit the induction signal to the touch control circuit 25, so as to control the all-on light-emitting display of the third light-emitting device 217, at the same time, the laundry machine will be started and wash according to the selected laundry mode, such glaring operation interface is quite flexible and smart, hence is beneficial to offering better user experience to improve the grades of the household electric appliances, and is quite convenient in operation.

The main circuit module 3 consists of a second circuit board 31, a cable connector 32 and a display module 33 provided in a parallel way with the first circuit board 21.

The second circuit board 31 is provided under the gap 213 of the first circuit board 21, and forms a height difference with the first circuit board 21, so that they can be spatially separated by a certain distance, and the second circuit board 31 can be electrically connected with the first circuit board 21 by a connector (not shown). In the present preferred embodiment, the touch control circuit 25 is provided on the second circuit board 31. Through the separation of the two circuit boards 21 and 31, the first touch sensor 211, the second touch sensor 214 and the third touch sensor 216 can be spatially separated from the touch control circuit 25, so that the interferences on the first touch sensor 211, the second touch sensor 214 and the third touch sensor 216 on the first circuit board 21, which are caused by the electromagnetic radiations emitted by the touch control circuit 25 on the second circuit board 31, can be reduced, hence preventing the fluctuation in the capacitance value of the touch sensor, which may lead to the generation of wrong induction signals and further lead to the misjudgment operation of the touch control circuit 25.

One end of the cable connector 32 can be directly welded on the second circuit board 31, and another end can be connected with other circuits in the laundry machine, for example, connected with the motor control board in the laundry machine, so that the related operation signals captured by the touch control circuit 25 can be transmitted to the main control circuit of the laundry machine to perform the operation control of the motor.

The display module 33 is correspondingly mounted under the display window 112 on the base 11 of the main panel 1. The display module 33 may be a LED light-emitting module or a LCD light-emitting module, which provides the indication of the working status of the laundry machine through displaying various kinds of light-emitting patterns. The display module 33 is provided in a parallel way at the gap 213 in one side of the first circuit board 21. Preferably, the second circuit board 31 is directly welded on the bottom surface of the display module 33, while the electronic components forming the touch control circuit 25 are provided on the bottom surface of the second circuit board 31 departing from the main panel 1, the structure in which the touch control circuit 25 on the second circuit board 31 is designed to depart from the touch sensors on the first circuit board 21 may also further reduce the interferences of the touch control circuit 25 on the touch sensors. On the other hand, through combining the display module 33 with relatively higher display density and the light-emitting module 2 with the touch function but relatively lower display density, it is beneficial to improving the button layout of the touch panel and reducing the cost.

Comparing with the prior arts, the touch panel of the Present Disclosure provides the touch sensors 211, 214 and 216 on the first circuit board 21, and provides the touch control circuit 25 on another relatively independent second circuit board 31, in this way, the first touch sensor 211, the second touch sensor 214 and the third touch sensor 216 can be spatially separated from the touch control circuit 25 by a certain distance, hence the electromagnetic interferences on the first touch sensor 211, the second touch sensor 214 and the third touch sensor 216 on the first circuit board 21, which are caused by the touch control circuit 25 and other power components on the second circuit board 31, can be reduced, so as to prevent the first touch sensor 211, the second touch sensor 214 and the third touch sensor 216 from generating wrong induction signals, as a result, the working reliability of the touch panel can be improved at a lower cost. In other possible embodiments (not shown), it is also easy to add a shielding construction (such as a shielding iron case) at the periphery of the second circuit board to further reduce the interferences of the touch control circuit on the touch sensors.

While a preferred embodiment of the Present Disclosure is shown and described, it is envisioned that those skilled in the art may devise various modifications without departing from the spirit and scope of the foregoing Description and the appended Claims.

What is claimed is:
1. A touch panel, the touch panel comprising:
a main panel, the main panel including a base, a plurality of side panels extending downward from the base, a plurality of display patterns disposed on the base, and a singular opening disposed therein, the base and the side panels defining a chamber, the singular opening being waterproof; and
a light-emitting touch module mounted under the main panel, the light-emitting touch module including:

a first circuit board, the first circuit board including a plurality of touch sensors and a plurality of light-emitting devices disposed under the main panel, each touch sensor inducing the approaching signals of the operator and transmitting the signals to a touch control circuit, the touch control circuit controlling the light-emitting status of a corresponding light-emitting device; and a second circuit board, the second circuit board being electrically connected to the first circuit board, the touch control circuit being disposed on the second circuit board, the second circuit board being separated from the first circuit board by a certain distance so that the electromagnetic interference of the touch control circuit may be reduced.

2. The touch panel of claim 1, wherein the light-emitting touch module further includes a display module provided in parallel with the first circuit board.

3. The touch panel of claim 1, wherein electronic components forming the touch control circuit are mounted on the bottom surface of the second circuit board.

4. The touch panel of claim 1, wherein the main panel further includes a plurality of display patterns disposed thereon.

5. The touch panel of claim 4, wherein the light-emitting touch module further includes a light-conducting piece, the lateral margins of the light-conducting piece being connected to the light-emitting device, the light-conducting piece configured to project the lights emitted by the light-emitting device upwards onto the display patterns of the main panel.

6. The touch panel of claim 5, wherein the light-emitting touch module further includes a light-reflecting piece provided under the light-conducting piece, the light reflecting piece reflecting light emitted from the bottom of the light-conducting piece back to the light-conducting piece.

7. The touch panel of claim 6, wherein the light-reflecting piece is a layer of light-reflecting film printed on the first circuit board with light-reflecting inks.

8. The touch panel of claim 7, wherein the light-reflecting film can be directly printed above the touch sensors.

9. The touch panel of claim 8, further including a distance piece provided between the main panel and the first circuit board.

10. The touch panel of claim 5, wherein the upper surface of the light-conducting piece is a cloudy surface, and the lower surface is a smooth surface.

11. The touch panel of claim 1, wherein the touch sensors are of the capacitance type, and the induction signals are the capacitance values of the touch sensors.

12. The touch panel of claim 1, wherein the main panel further includes a combined touch area and a plurality of sub-display units corresponding to the combined touch area, each sub-display unit including a corresponding display pattern.

13. The touch panel of claim 12, wherein the first circuit board includes a plurality of continuously-arranged touch sensors disposed under the combined touch area, the continuously-arranged touch sensors inducing the approaching signals of the operator and transmitting the signals to the touch control circuit for controlling the light-emitting status of the light-emitting device, each light-emitting device disposed under one sub-display unit.

14. The touch panel of claim 13, wherein the combined touch area shows a annular shape, each touch sensor corresponding to the combined touch area being continuously arranged on the first circuit board along the rotation direction in a head-to-tail way.

15. The touch panel of claim 2, wherein the second circuit board is mounted under the display module, forms a height difference with the first circuit board, and is electrically connected to the first circuit board by a connector.

16. The touch panel of claim 3, wherein the touch sensors are mounted on the top surface of the first circuit board.

17. The touch panel of claim 9, wherein the distance piece is manufactured by light-tight materials, and is provided with accommodation through-holes at the display patterns, the through-holes corresponding to the main panel to accommodate the light-conducting piece.

18. The touch panel of claim 14, wherein the boundary between the adjacent two touch sensors shows a goose-tail shape.

19. The touch panel of claim 18, wherein the touch control circuit monitors real-time induction signals of each touch sensor corresponding to the combined touch area, process these signals to determine the touch position of the operator in the combined touch area, and control the light-emitting status of the light-emitting device corresponding to the touch position to change from a first status to a second status.

20. The touch panel of claim 18, wherein the number of sub-display units is larger than the number of touch sensors corresponding to the combined touch area, and the touch control circuit can calculate the adjacent combination with the strongest induction signal change based on the signals of adjacent touch sensors corresponding to the combined touch area to specifically determine the touch position of the operator, and further control the light-emitting device of the sub-display unit corresponding to the touch position to change the light-emitting status from a first status to a second status.

* * * * *